Nov. 10, 1925.                                                1,561,173
W. KÖSTERS
METHOD AND DEVICE FOR EXAMINING END GAUGES
Filed Aug. 29, 1921
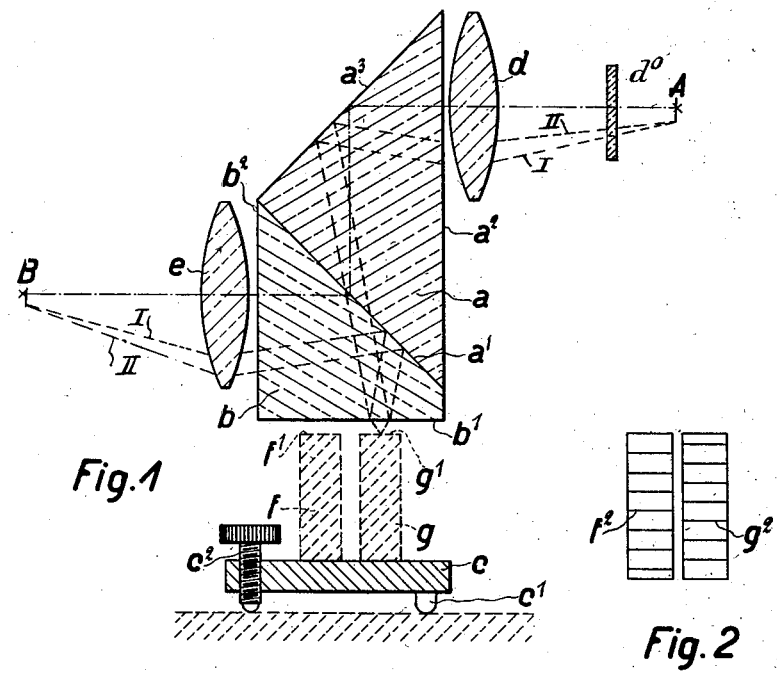
Fig. 1
Fig. 2
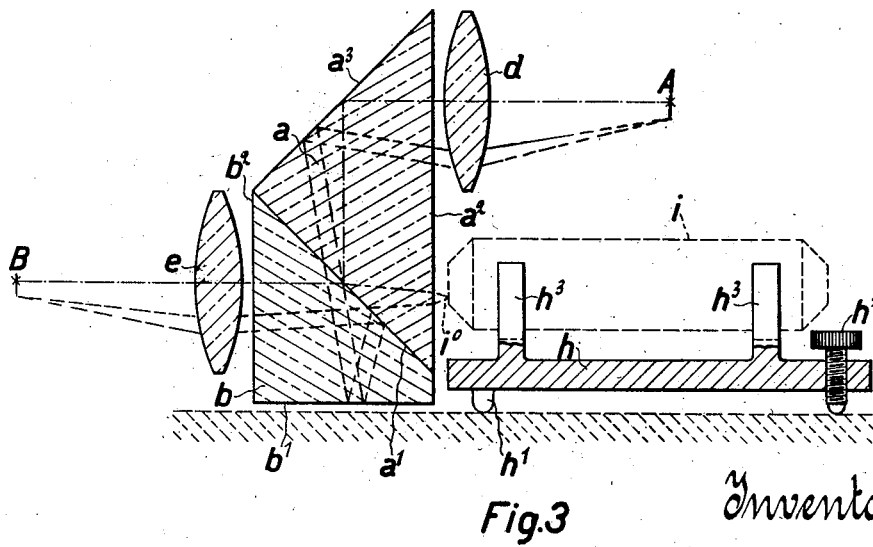
Fig. 3
Inventor:
Wilhelm Kösters Patented Nov. 10, 1925.

1,561,173

UNITED STATES PATENT OFFICE.

WILHELM KÖSTERS, OF BERLIN, GERMANY, ASSIGNOR TO THE FIRM OF CARL ZEISS, OF JENA, GERMANY.

METHOD AND DEVICE FOR EXAMINING END GAUGES.

Application filed August 29, 1921. Serial No. 496,703.

(GRANTED UNDER THE PROVISIONS OF THE ACT OF MARCH 3, 1921, 41 STAT. L., 1313.)

*To all whom it may concern:*

Be it known that I, WILHELM KÖSTERS, a citizen of the German Empire, and residing at Berlin, Germany, have invented a new and useful Method and Device for Examining End Gauges (for which I have filed an application in Germany, January 29, 1920), of which the following is a specification.

The present invention relates to methods and devices for the examination of end gauges by means of appearances of interference. The new method consists in the direct use of one end-surface of the end-gauge to be examined as one of the interference surfaces, while the other interference surface is presented by a body supported independently of the respective end-gauge. As one end-surface of the end-gauge serves itself as an interference surface, on the one hand, the sources of errors connected with the use of an intermediate body are obviated and, on the other hand, it is possible to obtain a direct, general view of the condition of the respective surface. Since the second interference surface belongs to a body which is supported independently of the respective end-gauge it is further possible to regulate the relative inclination of the intereference surface and their distance apart in such a way as to be best-suitable for the examination; hence the user is not subject to the restriction which exists if the body presenting the second interference surface is allowed to rest on the end-surface of the end-gauge instead of supporting it separately.

The principal point is to examine by the new method whether in end-gauges the end-surfaces are plane, whether these surfaces are parallel to each other, how great the length of the end-gauge is and (especially in cylindrical end-gauges) whether the end-surfaces are perpendicular to the axis of the end-gauge. Corresponding methods of examination are exemplified below. With regard to the examination of the length it may be particularly emphasized that the new method admits of directly comparing two end-gauges with each other by disposing them side by side and by causing at the same time both the one and the other to coact with the second interference surface; in that case two intereference images are obtained side by side and the difference in length can be deduced from the amount by which the one interference image is displaced relatively to the other. Hence, the sources of errors are suppressed which exist if, in order to compare two end-gauges with each other, the length of the one and the other be successively determined by means of a method of interference.

Fig. 1 of the annexed drawing shows as a constructional example a diagrammatic section through a device according to the invention; Fig. 2 shows the interference image presented to the observer. In Fig. 3 a diagrammatic section through a second constructional example is shown.

In Fig. 1 $a$ denotes a prism, one surface $a^1$ of which is silvered semi-perviously to light. On this surface there is cemented a second prism, $b$, the surface $b^1$ of which is silvered semi-perviously to light. Below the prism $b$ there is disposed a small table $c$ which rests on one side on two spherical extensions $c^1$ (only one being shown in the annexed drawing) and which is on the other side supported by a set screw $c^2$ (further adjusting devices here being neglected). In front of the upper half of the surface $a^2$ of the prism $a$ there is disposed a collective lens $d$, and behind the surface $b^2$ of the prism $b$, opposite the surface $a^2$, there is a collective lens $e$. In the focal plane of the lens $d$ there is disposed a source of light A. When placing on the small table $c$, e. g. two end-gauges $f$ and $g$, the rays emanating from the source of light A and hitting the lens $d$ emerge parallel to each other from this lens and enter the prism $a$ through the surface $a^2$. They are given a total reflection at the surface $a^3$ of the prism $a$ and then partly penetrate the surface $a^1$; in so far as they are not transmitted by the surface $a^1$, but reflected at it, they are not of any further importance. The part of the rays which has penetrated the surface $a^1$ strikes the surface $b^1$ and is again partly transmitted by the same and partly reflected. The transmitted rays strike the upper end-surfaces $f^1$ and $g^1$ of the end-gauges $f$ and $g$, are reflected there, partly penetrate again the surface $b^1$ and interfere with the part previously prevented from penetrating by this surface. The interfering rays are again partly reflected at the surface $a^1$ and transmitted to the lens $e$. The latter produces at the point B an image of the source of light disposed at the point A. In order to illustrate this process, Fig. 1 shows in addition to the axial ray two rays I and II which emanate from the source of light A outside the axis. The ray II hits the surface $b^1$ at the point where the part of the ray I, which has been reflected at the surface $g^1$, again hits the surface $b^1$. Consequently the rays I and II interfere with each other at that point. The interference point is imaged somewhat outside the axis by the lens $e$ at the point B.

Supposing that in each of the end-gauges the upper end-surface be parallel to the lower one and that the small table be so adjusted with the aid of the set screw $c^2$ that its surface is almost parallel to the surface $b^1$ of the prism, an observer, on bringing his eye to the point B, sees the interference image represented in Fig. 2 provided the source of light emits one-coloured light. Let $f^2$ and $g^2$ be fringes of like ordinal number (of like difference in the path), the relative displacement of $f^2$ and $g^2$ is a scale of the difference in length of the two end-gauges. Whether the fringes $f^2$ and $g^2$ are of like order, can be ascertained in the following manner. At the point A there should be disposed a source of light, emitting a mixture of different homogeneous kinds of light, which are as far as possible so selected as to correspond to the physiological elementary colours red, green and blue. In that case the different fringe-systems of the particular kinds of light overlap each other in a different way so that a system of manifold fringes of mixed colours arises in which case the colour and the succession of colours is at each place characteristic for the difference in the path. The same difference in the path exists at all those places in which like colour and like succession of colours exists. Behind the source of light A there is shown a color filter $d^0$. If the latter be made operative, the light entering the lens $d$ is substantially monochromatic. By making this filter inoperative, all kinds of light emitted by the source of light, enter the lens $d$. Whether in each of the two end-gauges the two end-surfaces are actually parallel to each other, can be ascertained for each end-gauge by rotating it on its lower surface by 180° and by observing whether the interference image resulting from it then changes.

In the example shown in Fig. 3 the prism system composed of the prisms $a$ and $b$ agrees with that of the first constructional example, except that in the second example the surface $b^1$ of the prism $b$ is not silvered semi-perviously but completely reflecting. The lenses $d$ and $e$ correspond to those of the first example. Beside the prism system there is disposed a base plate $h$ which rests on the one side on two spherical extensions $h^1$ and which is on the other side supported by a set screw $h^2$ (further adjusting devices here being neglected). The said base plate carries two V-shaped bearings $h^3$. By placing, e. g. into these bearings a cylindrical end-gauge $i$, there results a path of rays, very similar to that described in the first example, however, the interference between the rays, reflected at the end-surface $i^0$ of the end-gauge, on the one hand, and the rays reflected at the surface $b^1$ of the prism $b$, on the other hand, occurs in that case. It is possible, for instance, to examine whether the end-surface $i^0$ stands perpendicularly on the axis of the end-gauge $i$ by rotating the latter in the bearings $h^3$; if the surface $i^0$ stands perpendicularly on the axis, the interference image does not change with the rotation.

I claim:

1. In a device for examining end-gauges a support, adapted to receive the end-gauges to be examined, a prism system containing a reflecting surface pervious to light and substantially parallel to an end-surface of the end-gauge to be examined, a second reflecting surface pervious to light and inclined to the first-named reflecting surface, a source of light, a collective lens system disposed between the said prism system and the said source of light at a distance from the latter substantially equal to the focal length of the lens system, the rays, emanating from the source of light, thus being transmitted to the first-named reflecting surface under conditions suitable to cause the rays to interfere with each other after having been reflected at this said end-surface on the one hand and the reflecting surface on the other hand, and a second collective lens system adapted to receive the rays leaving the prism system.

2. In a device for examining end-gauges, a support adapted to receive several end-gauges side by side, a prism system containing a reflecting surface pervious to light and substantially parallel to the free end-surfaces of the end-gauges to be examined, a second reflecting surface pervious to light and inclined to the first-named reflecting surface, a source of light, a collective lens system disposed between the said prism system and the said source of light at a distance from the latter substantially equal to the focal length of the lens system, the rays, emanating from the source of light, thus being transmitted to the first-named reflecting surface under conditions suitable to cause the rays to interfere with each other after having been reflected at the said end-surfaces on the one hand and this reflecting surface on the other hand, and a second collective lens system adapted to receive the rays leaving the prism system.

3. In a device for examining end-gauges a support adapted to receive several end-gauges side by side, a prism system containing a reflecting surface pervious to light and substantially parallel to the free end-surfaces of the end-gauges to be examined, a second reflecting surface pervious to light and inclined to the first-named reflecting surface, a source of light capable of emitting a mixture of homogeneous kinds of light, a color filter adapted to be brought into the path of rays and out of the same, a collective lens system disposed between the said prism system and the said source of light at a distance from the latter substantially equal to the focal length of the lens system, the rays, emanating from the source of light thus being transmitted to the first-named reflecting surface under conditions suitable to cause the rays to interfere with each other after having been reflected at the said end-surfaces on the one hand and this reflecting surface on the other hand, and a second collective lens system adapted to receive the rays leaving the prism system.

WILHELM KÖSTERS.